(12) United States Patent
Pelletier et al.

(10) Patent No.: US 8,566,572 B2
(45) Date of Patent: Oct. 22, 2013

(54) METHOD, DEVICE AND NON-TRANSITORY COMPUTER READABLE STORAGE MEDIUM FOR MASKING THE END OF LIFE TRANSITION OF A ELECTRONIC DEVICE

(75) Inventors: Hervé Pelletier, Paris (FR); Pascal Dumas, Paris (FR)

(73) Assignee: Morpho, Paris (FR)

( * ) Notice: Subject to any disclaimer, the term of this patent is extended or adjusted under 35 U.S.C. 154(b) by 654 days.

(21) Appl. No.: 12/744,419

(22) PCT Filed: Nov. 21, 2008

(86) PCT No.: PCT/FR2008/052106
§ 371 (c)(1),
(2), (4) Date: Aug. 5, 2010

(87) PCT Pub. No.: WO2009/071819
PCT Pub. Date: Jun. 11, 2009

(65) Prior Publication Data
US 2010/0299511 A1 Nov. 25, 2010

(30) Foreign Application Priority Data
Nov. 26, 2007 (FR) .................................. 07 08242

(51) Int. Cl.
*G06F 9/00* (2006.01)
*G06F 12/14* (2006.01)

(52) U.S. Cl.
USPC ............................................. 713/2; 713/194

(58) Field of Classification Search
USPC ................................................... 713/2, 194
See application file for complete search history.

(56) References Cited

U.S. PATENT DOCUMENTS

| 4,295,041 A | * | 10/1981 | Ugon ............................. 235/487 |
| 4,813,024 A | * | 3/1989 | Lisimaque et al. ...... 365/185.04 |
| 4,932,053 A | * | 6/1990 | Fruhauf et al. ................. 380/252 |
| 4,960,982 A | * | 10/1990 | Takahira ....................... 235/382 |

(Continued)

FOREIGN PATENT DOCUMENTS

| EP | 1062633 | 12/2000 |
| FR | 2 776 410 | 3/1998 |

(Continued)

OTHER PUBLICATIONS

Barnum et al., "Failing Securely", Dec. 5, 2005, US Department of Homeland Security.

(Continued)

*Primary Examiner* — Chun Cao
(74) *Attorney, Agent, or Firm* — Miller, Matthias & Hull LLP (57) ABSTRACT

A method of masking the end-of-life transition of a microprocessor electronic device including reprogrammable non-volatile memory containing an end-of-life state variable. On booting, the value of the variable is loaded into RAM. After executing any current command, it is verified whether the value of the variable stored in RAM is FALSE. If the response is negative, the end-of-life transition is executed. Otherwise, initialization or execution of the command is continued. On detecting an intrusive attack, it is instantiated by writing the TRUE value to the end-of-life state variable in RAM only and then deferring writing of the TRUE value to the variable in the non-volatile memory until the next write operation. The invention is applicable to any electronic device, smart card, etc.

10 Claims, 4 Drawing Sheets

(56) References Cited

U.S. PATENT DOCUMENTS

| | | | |
|---|---|---|---|
| 5,533,123 A | | 7/1996 | Force et al. |
| 5,592,619 A | * | 1/1997 | Shona .............................. 726/32 |
| 6,341,239 B1 | * | 1/2002 | Hayashi et al. ................. 700/79 |
| 6,698,662 B1 | * | 3/2004 | Feyt et al. ..................... 235/492 |
| 7,848,515 B2 | * | 12/2010 | Dupaquis et al. ............... 380/28 |
| 2006/0112436 A1 | | 5/2006 | Modave |
| 2007/0136529 A1 | | 6/2007 | Otterstedt et al. |
| 2007/0159882 A1 | | 7/2007 | Liardet et al. |
| 2007/0220603 A1 | | 9/2007 | Chamberot |

FOREIGN PATENT DOCUMENTS

| | | | |
|---|---|---|---|
| FR | 2 784 763 | | 10/1998 |
| WO | WO 01/03084 | | 1/2001 |
| WO | WO 02/01368 | * | 1/2002 |

OTHER PUBLICATIONS

Engin et al., "Power Analysis Resistant SRAM", Jul. 24-26, 2006, World Automation Congress.

* cited by examiner

METHOD, DEVICE AND NON-TRANSITORY COMPUTER READABLE STORAGE MEDIUM FOR MASKING THE END OF LIFE TRANSITION OF A ELECTRONIC DEVICE

CROSS-REFERENCE TO RELATED APPLICATIONS

This application is a U.S. national stage filing under 35 USC §371 of International Patent Application No. PCT/FR2008/052106 filed on Nov. 21, 2008, which claims priority under the Paris Convention to French Patent Application No. 07 08242, filed on Nov. 26, 2007.

FIELD OF THE DISCLOSURE

The invention relates to a method of masking the end-of-life transition of an electronic device, the device comprising an input/output port, a microprocessor, random access memory (RAM), read-only memory (ROM), and a reprogrammable non-volatile memory containing an end-of-life state variable for the electronic device that is controlled by a control module.

BACKGROUND OF THE DISCLOSURE

Such electronic devices correspond, in non-exclusive manner, to electronic cards, or to any electronic device including at least, or coming into communication with, an electronic card, such as, in particular, a smart card for which good security is required against any external intrusion.

In order to ensure that the above-mentioned cards present good security, an end-of-life transition mechanism is activated on detecting certain critical errors.

Nevertheless, the end-of-life transition process for that type of device, particularly when relating to smart cards, appears to be problematic since such a process relies, in broad terms, on a process of writing to a non-volatile reprogrammable memory, generally an electrically erasable programmable read-only memory (EEPROM), said write process having the purpose of erasing data and blocking applications.

Such a process nevertheless appears to be vulnerable since it can be detected from outside the card, in particular because of the large amount of current drawn by the process of writing in the reprogrammable memory, and also because it requires a certain length of time to be performed.

A dishonest third party is thus free to prevent execution of such a process by cutting off the electrical power supply to the device or to the card.

SUMMARY OF THE DISCLOSURE

Consequently, an object of the present invention is to make the end-of-life transition process for such an electronic device completely certain within a random period of time after the event, or critical error, that originated triggering of the end-of-life transition, with this being done by masking, in particular from any third party, the operation of writing in non-volatile memory that corresponds to the end-of-life transition, thus having the effect, in practice, of preventing any hidden channel attack.

According to a remarkable aspect, the invention masks any writing of an end-of-life transition variable in non-volatile memory of an electronic device by diluting said write operation in the normal running of the application program being executed by the electronic device.

The method of the invention that masks the end-of-life transition of an electronic device is applicable to any electronic device comprising a microprocessor, RAM, ROM, a reprogrammable non-volatile memory containing an end-of-life state variable controlled by a control module, and an input/output port.

The method is remarkable in that, on booting of the electronic device, the method consists in loading the value of the end-of-life state variable into RAM from the non-volatile memory, and prior to the microprocessor executing any current command, in verifying whether said end-of-life state variable stored in RAM has the value FALSE, and on a negative response to said verification, executing the end-of-life transition operations for the electronic device; otherwise, since the end-of-life state variable stored in RAM has the value FALSE, continuing with the initialization or execution of the current command by the microprocessor of the electronic device, and on detecting an intrusive attack, instantiating the end-of-life state variable of the electronic device by writing the TRUE value to the end-of-life state variable in RAM only and in continuing with the initialization and/or execution of the current command, and in deferring writing of the TRUE value to the end-of-life state variable in the non-volatile memory so as to perform said write operation as a replacement for the next operation of writing to non-volatile memory, thereby enabling the writing of the end-of-life state variable to be masked.

The method of the invention is also remarkable in that it further consists, prior to the microprocessor executing each command, in loading the value of the end-of-life state variable into RAM from the non-volatile memory.

The method of the invention is also remarkable in that for a set of commands executed by the microprocessor of the electronic device that includes commands that systematically involve writing in non-volatile memory and commands that do not involve writing in non-volatile memory, the method further consists, independently of detecting or not detecting an intrusive attack, in writing a dummy byte in non-volatile memory, thereby enabling any writing of the end-of-life state variable of the electronic device in non-volatile memory to be masked.

Preferably, the operation of writing the dummy byte in non-volatile memory is performed in the same memory page as the page occupied by the end-of-life state variable.

In addition, in another remarkable aspect of the method of the invention, the operation of writing said dummy byte in non-volatile memory is executed prior to executing any operation of transmitting data over the line of the input/output port of the electronic device.

According to another remarkable aspect, the method of the invention further includes, consecutively with any step of writing the end-of-life state variable in volatile memory, a step that consists in verifying whether the end-of-life state variable has the value TRUE, and if it has the value TRUE, a step of executing the end-of-life transition operations for the electronic device.

In another aspect, the method of the invention is also remarkable in that, on verifying that the end-of-life state variable does indeed have the value TRUE, the operation of writing the dummy byte in non-volatile memory is replaced by the operation of writing the value of the end-of-life state variable in non-volatile memory.

The electronic device of the invention comprises a microprocessor, RAM, ROM, a reprogrammable non-volatile memory containing an end-of-life state variable for the electronic device controlled by a control module, and an input/output (I/O) port. The device is remarkable in that the control module includes a computer program module for executing the steps of the above-mentioned method of the invention.

The method of the invention for masking the end-of-life transition of an electronic device and the electronic device of the invention including a corresponding control module are applicable to any type of electronic device, but in preferred and non-limiting manner, they are applicable to electronic devices such as smart cards that process and/or store data that is personal, private, or secret.

BRIEF DESCRIPTION OF THE DRAWINGS

They can be better understood on reading the following description and on observing the accompanying figures, in which:

FIG. 1b is a purely illustrative timing chart of the various steps executed while implementing the method of the invention as shown in FIG. 1a;

FIGS. 1c to 1f show implementation details of steps of the method shown in FIG. 1a.

DETAILED DESCRIPTION OF THE DISCLOSURE

A more detailed description of the method in accordance with the present invention for masking the end-of-life transition of an electronic device is given below with reference to FIGS. 1a to 1f.

In general, the method of the present invention for masking the end-of-life transition of an electronic card is applicable to any electronic device including a microprocessor, RAM, ROM, and a reprogrammable non-volatile memory containing an end-of-life state variable for the electronic device and managed by a control module. More particularly, the electronic device may also comprise an inlet/outlet port enabling data to be exchanged with a host appliance or even with a network, for example. The concept of reprogrammable non-volatile memory covers electrically reprogrammable memories, EEPROM memories, flash memories, for example.

While in operation, the above-mentioned electronic appliance executes a boot stage referred to as answer to reset (ATR), and then successive current commands, referenced COM.

It can be understood in particular that the corresponding electronic device may advantageously be constituted by any smart card, for example.

Figure 1A:
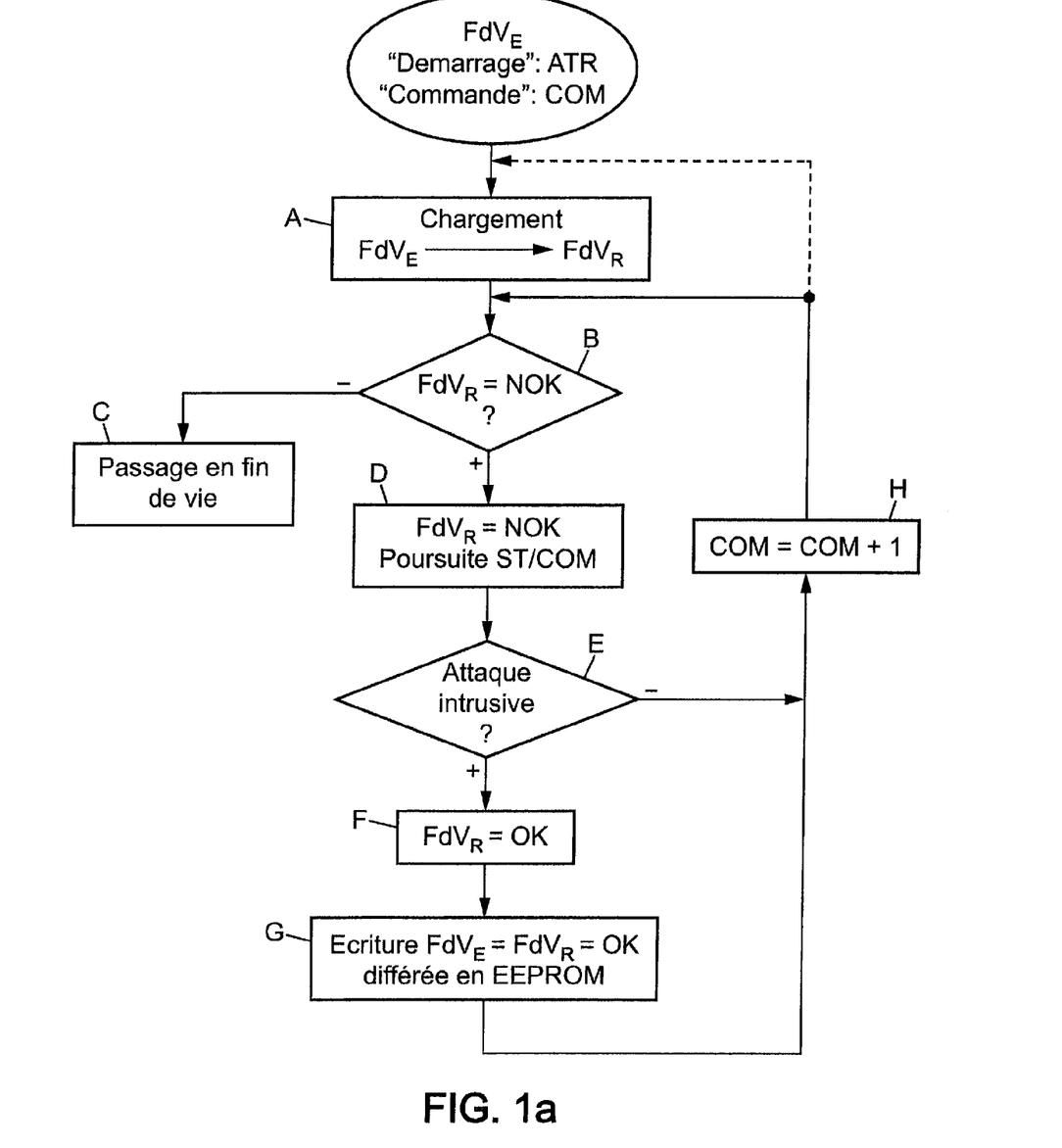
FIG. 1a is a purely illustrative flow chart of the essential steps for implementing the method of the invention.

With reference to FIG. 1a, the method of the invention for masking the end-of-life transition of an electronic device includes a step A that consists in loading the RAM of the electronic device from the non-volatile memory thereof with the value, written $FdV_E$, of the end-of-life variable stored in the non-volatile memory.

The operation corresponding to step A is written:

$$FdV_E \rightarrow FdV_R$$

In the above relationship, $FdV_R$ designates the value of the end-of-life state variable of the electronic device as loaded into RAM.

After step A in FIG. 1a, and prior to the microprocessor executing any current command COM, the method of the invention then consists, in a step B, in verifying whether the value of the end-of-life state variable stored in the RAM has the value FALSE. In step B in FIG. 1a, this verification is represented by a test step:

$$FdV_R = NOK?$$

In this relationship, NOK represents the FALSE value of the end-of-life state variable for the electronic device as stored in RAM.

If the test of step B gives a negative response, then the method of the invention consists in a step C in executing the end-of-life transition operations for the electronic device.

Otherwise, if the test performed in step B gives a positive response, then the end-of-life state variable $FdV_R$ stored in RAM has the value FALSE, i.e. NOK, and the method of the invention consists in the microprocessor of the electronic device continuing initialization or execution of the current command COM. Executing the current command corresponds to executing any command of an application executed by the electronic device.

During this execution, and in the event of an intrusive attack being detected in a step E, the method of the invention consists, in a step F, in instantiating the variable $FdV_R$ by writing the TRUE value to the variable $FdV_R$, i.e. the end-of-life state variable of the electronic device, but only in the RAM, and then continuing to initialize and/or execute the current command COM.

In step F of FIG. 1a, the instantiation operation is written by the relationship:

$$FdV_R = OK$$

In the above relationship, the value OK designates the TRUE value for the end-of-life state variable as stored in RAM.

Finally, the above-mentioned instantiation step F is followed by a step G consisting in deferring writing the TRUE value to the end-of-life state variable $FdV_E$ in the non-volatile memory, so that this write operation takes place as a replacement for the next write operation in non-volatile memory. This serves to mask writing of the end-of-life state variable.

It will naturally be understood that above-described step G is followed by a return to executing the following current command via a step H. In step H, COM+1 designates the following command.

As shown in FIG. 1a, a return is made to step B to execute the following command, only.

Nevertheless, in another possible implementation of the method of the invention, as represented by dashed lines in FIG. 1a, the return may be to upstream of the loading operation performed in step A so as to renew the process of loading the value of the end-of-life state variable $FdV_E$ into RAM in systematic manner. Such a process is nevertheless not essential, but it can be implemented in a variant.

Figure 1B:
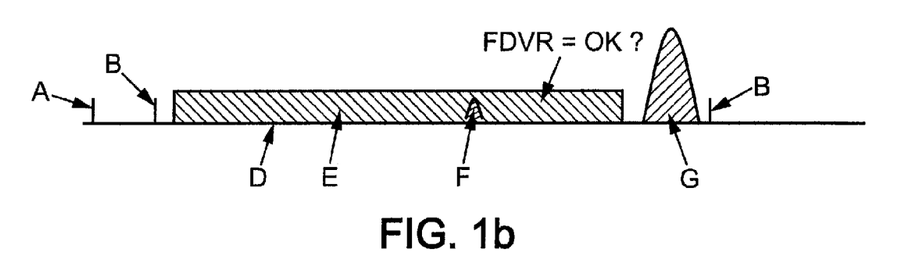

FIG. 1b is a timing chart for the execution operations of the steps in FIG. 1a.

In particular, step A may be executed on booting ATR or prior to executing each command COM, as mentioned above.

The test in step B is executed before continuing with booting or before executing the current command represented by left-sloping shading in FIG. 1b. It is recalled that a negative response to the test in step B leads automatically to the end-of-life transition of the electronic device in step C.

Continued booting or initialization or indeed execution of the current command in step D corresponds in fact to implementing algorithmic processes that manipulate secrets for the electronic device, e.g. when it is constituted by a smart card.

The test in step E that corresponds to a test for detecting an intrusive attack may be implemented in conventional manner either by executing mechanisms against differential fault analysis (DFA), i.e. a method of attack that consists in introducing an error into processing in order to deduce therefrom information about the data being processed, or else by processes for verifying data integrity, for example.

The step of instantiating the end-of-life state variable of the electronic device by writing solely in RAM, i.e. step F, is executed by the module for controlling the end-of-life transition of the electronic device and is performed by writing the TRUE value to this state variable in application of the above-mentioned relationship:

$$FdV_R=OK$$

Step G consisting in updating the end-of-life state variable $FdV_E$ in non-volatile memory, i.e. usually in EEPROM, is then executed in deferred manner, i.e. replacing the next write operation that is to be performed in the command.

In FIG. 1b, this operation is represented by a peak with right-sloping shading representing the increase in current consumption by the above-mentioned memory because of the operation of writing thereto.

Step E is then followed by a return step either to step B or to step A, as described above with reference to FIG. 1a.

More specifically, the FALSE value, written NOK, of the end-of-life state variable of the electronic device has a numerical value that is arbitrary. In contrast, the TRUE value OK of the end-of-life state variable is any numerical value that is different from the above-mentioned arbitrary numerical value.

Figure 1C:
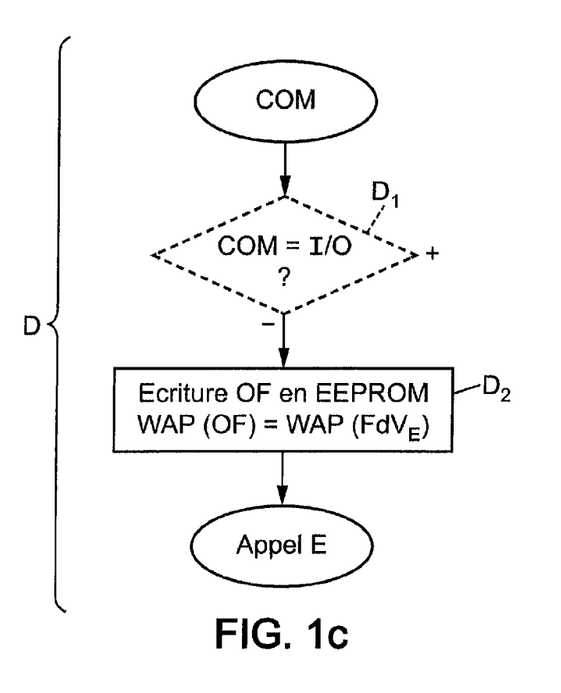

Thus, as also shown in FIG. 1c, consideration is given to any set of commands executed by the microprocessor of the electronic device including commands ($COM_W$) that systematically involve writing in the non-volatile memory, and commands ($COM_{\overline{W}}$) that do not involve writing on non-volatile memory. On this assumption, the method of the invention consists, independently of detecting or not detecting an intrusive attack, in performing a write operation $D_2$ of writing a dummy byte in non-volatile memory, which byte is written DB. This serves to mask any possible writing of the end-of-life state variable of the electronic device in non-volatile memory.

Preferably, the dummy byte DB is written in the same memory page as the page occupied by the end-of-life state variable.

In step $D_2$ as shown in FIG. 1c, the operation of writing to the same memory page is represented by the relationship:

$$WAP(DB)=WAP(FdV_E)$$

In the above relationship, WAP designates the address of the write memory page.

Step $D_2$ is followed by calling step E of FIG. 1a.

In addition, and as shown also in FIG. 1c, the operation of writing the dummy byte in non-volatile memory is executed prior to any operation of transmitting data over the line of the input/output port of the electronic device. In FIG. 1c, the corresponding operation is represented symbolically by detecting any input/output operation by the relationship;

$$COM=I/O?$$

Detecting such an operation then causes the dummy byte to be written systematically and immediately, as described above in the description.

Figure 1D:
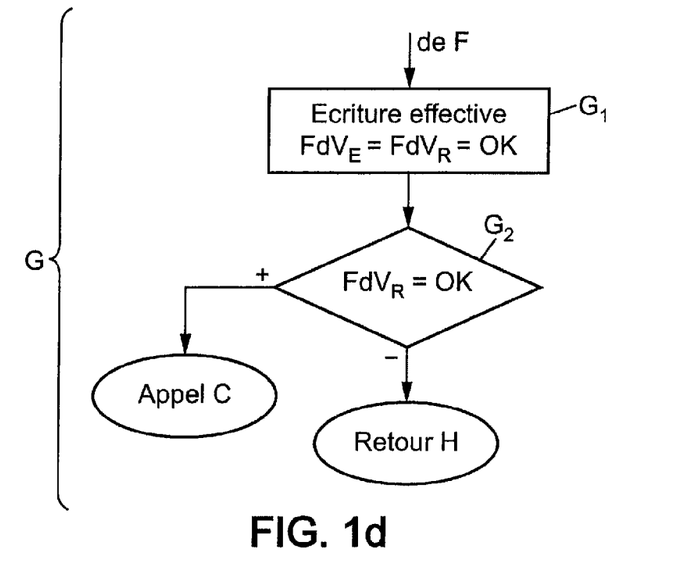

Finally, as shown in FIG. 1d, the method of the invention advantageously includes, consecutively with any step of writing the end-of-life state variable in non-volatile memory as represented by step $G_1$, a step written $G_2$ that consists in verifying whether the value of the end-of-life state variable $FdV_R$ as stored in RAM is true. The operation corresponding to the above-described step is written as the following relationship:

$$FdV_R=OK$$

On finding that the end-of-life state variable has the value TRUE, a step of executing end-of-life transition operations for the electronic device is performed by calling step C as shown in FIG. 1a.

Otherwise, if the end-of-life state variable does not have the value TRUE, then a return is performed to step H.

Figure 1E:
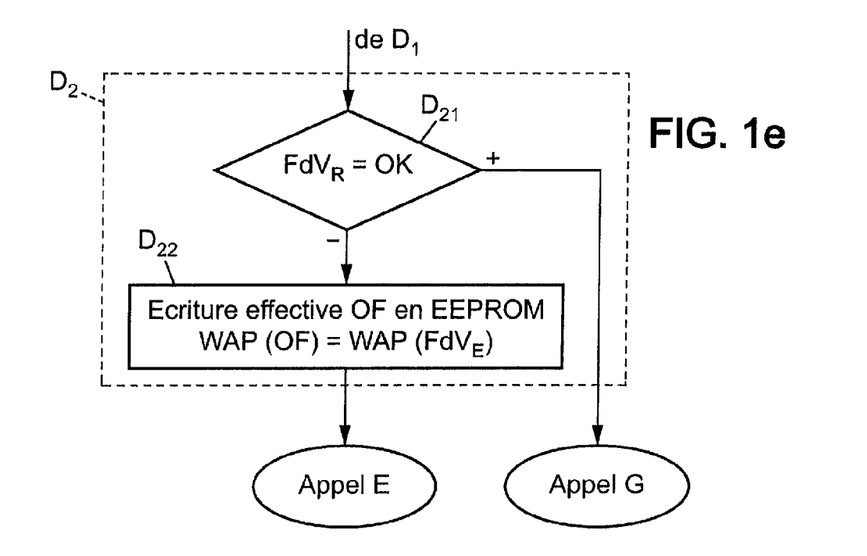

In addition, as also shown in FIG. 1e, on verifying, in the step $D_{21}$, that the value of the end-of-life state variable $FdV_R$ is true, i.e. on a positive response from said test $D_{21}$, instead of performing the operation of writing the dummy byte DB in non-volatile memory, as presented by step $D_{22}$ in FIG. 1e, a call is made to step G of FIG. 1a in order to write the value of the end-of-life state variable $FdV_E$ in the EEPROM.

The method of the invention also makes it possible to implement an error counter.

In general, updating an error counter is subjected to the same restriction as writing an end-of-life variable.

Because such a write operation consists in writing in non-volatile memory, of the EEPROM type, it is normally detectable because of the extra current consumed by the memory while performing the write operation.

In the event of errors being detected that do not justify a direct end-of-life transition, the method of the invention thus advantageously makes it possible to implement a counter prior to performing the normal write operation. The value of the counter is subsequently verified regularly, and crossing a threshold value then serves to trigger an end-of-life transition.

Figure 1F:
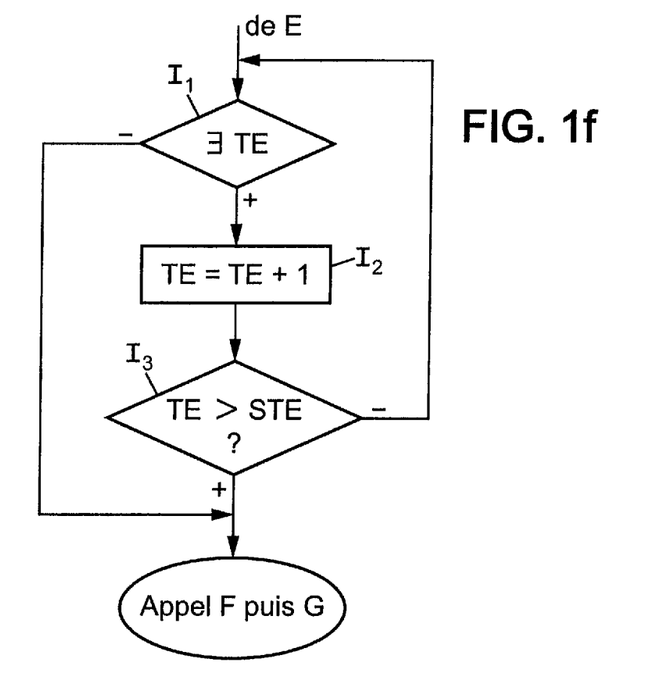

Such a mode of operation is shown in FIG. 1f, as follows:
on detecting $I_1$ a temporary execution error of an instruction, other than an intrusive attack and not justifying an end-of-life transition of the electronic device, with detection of the temporary error being written ∃ TE?, where TE designates the above-mentioned temporary execution error, a positive response to test $I_1$ calls an updating step $I_2$ that implements an error counter in RAM.

The update value in step $I_2$ represented by the relationship:

$$TE=TE+1$$

is then followed by a comparison step $I_3$ where the updated count value is compared with a threshold value written STE.

In test step $I_3$ the comparison operation is written:

$$TE>STE?$$

On the threshold value being crossed by the updated error count value, i.e. on the test $I_3$ giving a positive response, the value TRUE is written to the end-of-life state variable of the electronic device and the end-of-life transition is performed by calling step F and then G, as shown in FIG. 1f.

An electronic device having a microprocessor referenced $1_1$, RAM referenced $1_2$, non-volatile memory of the EEPROM type referenced $1_3$, and ROM referenced $1_4$ is described below with reference to FIG. 2. In addition, as shown in said figure, the device also includes an input/output port I/O.

Figure 2:
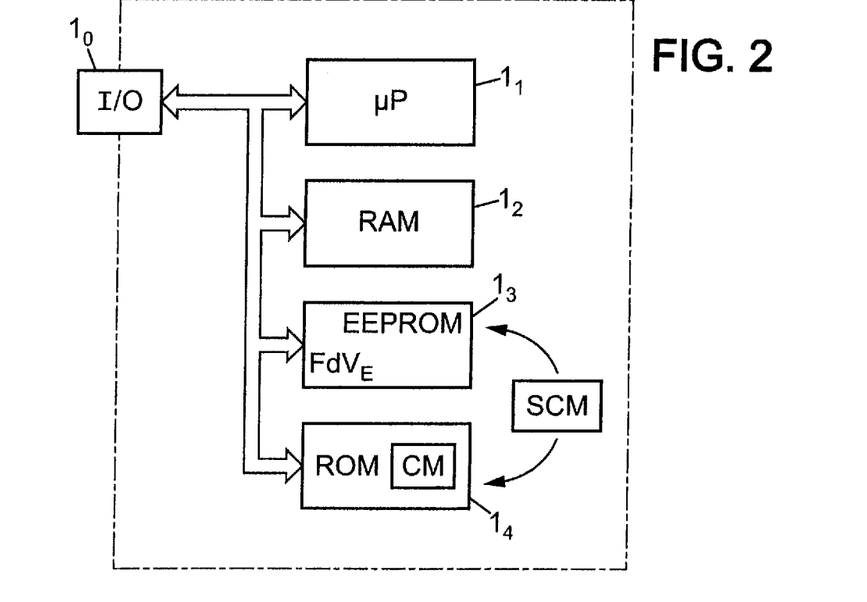
FIG. 2 is a purely illustrative block diagram showing the architecture of an electronic device provided with a module for controlling an end-of-life transition in accordance with the present invention.

As shown in FIG. 2, the electronic device in operation has an end-of-life state variable for said electronic device, written $FdV_E$, that is managed by a control module CM that may for example be a software module implanted in the ROM $1_4$.

The control module CM includes a computer program SCM that is naturally capable of executing the steps of the method of masking the end-of-life transition of an electronic device, as described above with reference to FIGS. 1a to 1f.

Naturally, the computer program module SCM may be implanted in non-volatile memory of the EEPROM type, since that constitutes a memory medium. The computer program module includes a sequence of instructions executable by the microprocessor of the electronic device, and on executing the above-described instructions, it executes the steps of implementing the method as described above with reference to FIGS. 1a to 1f.

The method of the invention for masking the end-of-life transition of an electronic device has been implemented on smart cards. Very thorough testing performed on those smart cards by independent trustworthy entities has not succeeded in preventing the end-of-life transition of said smart cards, unlike smart cards having conventional end-of-life transition processes, with which it is possible to repeat intrusive attacks until a usable weakness is revealed. Consequently, it can be seen that the method of the invention ensures that it is no longer possible to distinguish in time between circumstances in which an attack is detected and will therefore lead to the end-of-life transition of the electronic device and circumstances in which the attack is not detected or does not produce any effect.

The invention claimed is:

1. A method of masking an end-of-life transition of an electronic device comprising a microprocessor, RAM, ROM, a reprogrammable non-volatile memory containing a value of end-of-life state variable of the electronic device controlled by a control module, and an input/output port, the method comprising, on booting of the electronic device, at least the steps of:
    storing in RAM the value of said end-of-life state variable RAM from said non-volatile memory; and prior to executing any current command by said microprocessor;
    verifying whether the value of said end-of-life state variable stored in RAM is false; and, if said verification gives a negative response;
    executing end-of-life transition operations for the electronic device; else, with the value of said end-of-life state variable stored in RAM being false;
    continuing with initialization or execution of the current command by the microprocessor of the electronic device; and, on detecting an intrusive attack,
    instantiating by writing the value TRUE to said end-of-life state variable of the electronic device in RAM only and continuing the initialization and/or execution of the current command; and
    deferring writing of the value TRUE to the end-of-life state variable in said non-volatile memory so as to perform said write operation as a replacement for the next operation of writing to non-volatile memory in the command, thereby enabling the writing of said end-of-life state variable to be masked.

2. A method according to claim 1, wherein the FALSE value of said end-of-life state variable of the electronic device is an arbitrary numerical value and in that the TRUE value of said end-of-life state variable of the electronic device is any numerical value other than said arbitrary numerical value.

3. A method according to claim 1, wherein for a set of commands executed by the microprocessor of the electronic device including commands that systematically involve writing in non-volatile memory and commands that do not involve writing in non-volatile memory, said method further comprises, independently of detecting or not detecting an intrusive attack, writing a dummy byte in non-volatile memory, thereby enabling any writing of the end-of-life state variable of the electronic device in non-volatile memory to be masked.

4. A method according to claim 3, further comprising writing said dummy byte in the same memory page as the page occupied by said end-of-life state variable.

5. A method according to claim 3, wherein said operation of writing said dummy byte in non-volatile memory is performed prior to executing any operation of transmitting data over the line of the input/output port of the microprocessor electronic device.

6. A method according to claim 5, wherein, on verifying that said end-of-life state variable has the TRUE value, said operation of writing said dummy byte in the non-volatile memory is replaced by the operation of writing the value of the end-of-life state variable in the non-volatile memory.

7. A method according to claim 3, wherein the method further includes, consecutively with any step of writing the end-of-life state variable in the non-volatile memory, a step that consists in verifying whether the value of said end-of-life state variable as stored in RAM is true, and if it is true, a step of executing the end-of-life transition operations for the electronic device.

8. A method according to claim 1, wherein, on detecting a temporary execution error for an instruction other than an intrusive attack, the error not justifying an end-of-life transition for the electronic device, said method further includes:
    updating an error counter in RAM by incrementing it;
    comparing the error count value with a threshold value; and
        if said threshold value has been crossed by said error count value;
    writing the TRUE value to said end-of-life state variable of the electronic device and triggering the end-of-life transition of the electronic device.

9. An electronic device comprising a microprocessor, RAM, ROM, a reprogrammable non-volatile memory containing a value of end-of-life state variable of the electronic device controlled by a control module, and an input/output port, wherein said control module includes a computer program module for at least:
    storing in RAM the value of said end-of-life state variable from said non-volatile memory; and prior to executing any current command by said microprocessor;
    verifying-whether the value of said end-of-life state variable stored in RAM is false; and, if said verification gives a negative response;
    executing end-of-life transition operations for the electronic device; else, with the value of said end-of-life state variable stored in RAM being false;
    continuing with initialization or execution of the current command by the microprocessor of the electronic device; and, on detecting an intrusive attack;
    instantiating by writing the value TRUE to said end-of-life state variable of the electronic device in RAM only and continuing the initialization and/or execution of the current command; and
    deferring writing of the value TRUE to the end-of-life state variable in said non-volatile memory so as to perform said write operation as a replacement for the next operation of writing to non-volatile memory in the command, thereby enabling the writing of said end-of-life state variable to be masked.

10. A non-transitory computer readable storage medium, with a program stored thereon, the program including a sequence of instructions executable by a computer or by the microprocessor of an electronic device, wherein on executing said instructions said program executes at least:

storing in RAM a value of said end-of-life state variable from said non-volatile memory; and prior to executing any current command by said microprocessor;

verifying-whether the value of said end-of-life state variable stored in RAM is false; and, if said verification gives a negative response;

executing end-of-life transition operations for the electronic device; else, with the value of said end-of-life state variable stored in RAM being false;

continuing with initialization or execution of the current command by the microprocessor of the electronic device; and, on detecting an intrusive attack;

instantiating by writing the value TRUE to said end-of-life state variable of the electronic device in RAM only and continuing the initialization and/or execution of the current command; and deferring writing of the value TRUE to the end-of-life state variable in said non-volatile memory so as to perform said write operation as a replacement for the next operation of writing to non-volatile memory in the command, thereby enabling the writing of said end-of-life state variable to be masked.

\* \* \* \* \*